United States Patent [19]

Seemann

[11] Patent Number: 5,052,906

[45] Date of Patent: * Oct. 1, 1991

[54] PLASTIC TRANSFER MOLDING APPARATUS FOR THE PRODUCTION OF FIBER REINFORCED PLASTIC STRUCTURES

[75] Inventor: William H. Seemann, Ocean Springs, Miss.

[73] Assignee: Seemann Composite Systems, Inc., Gulfport, Miss.

[*] Notice: The portion of the term of this patent subsequent to Feb. 20, 2007 has been disclaimed.

[21] Appl. No.: 453,824

[22] Filed: Dec. 21, 1989

Related U.S. Application Data

[63] Continuation-in-part of Ser. No. 333,747, Mar. 30, 1989, Pat. No. 4,902,215, which is a continuation of Ser. No. 203,806, Jun. 8, 1988, abandoned.

[51] Int. Cl.$^5$ .............................................. B29C 43/02
[52] U.S. Cl. ..................................... 425/112; 425/406; 425/389; 425/405.1; 425/546; 264/258
[58] Field of Search ............... 264/101, 102, 136, 137, 264/257, 258, 313, 324, 510, 511, 512; 156/87, 286, 382, 500; 425/405.1, 112, 406, 388, 389, 546

[56] References Cited

U.S. PATENT DOCUMENTS

| 2,913,036 | 11/1959 | Smith | 154/1.6 |
| 4,124,678 | 11/1978 | Stroupe | 264/314 |
| 4,312,829 | 1/1982 | Fourcher | 264/571 |
| 4,873,055 | 10/1989 | Epel | 264/257 |
| 4,880,583 | 11/1989 | Douglas | 264/257 |
| 4,902,215 | 2/1990 | Seemann, III | 425/406 |

FOREIGN PATENT DOCUMENTS 83191939  5/1985  Japan.
944955  12/1963  United Kingdom.

Primary Examiner—Jay H. Woo
Assistant Examiner—Jeremiah F. Durkin, II
Attorney, Agent, or Firm—Llewellyn A. Proctor

[57] ABSTRACT

Apparatus for the production of high strength fiber reinforced plastic structures via an improved vacuum assisted technique. A fluid impervious outer sheet is marginally sealed upon a mold to provide an enclosure, or chamber, in which a fiber lay up can be placed. The fluid impervious outer sheet is provided with a vacuum outlet, and the mold is provided with a resin inlet. Primary distribution media are provided one located on one side of the fiber lay up and the other on the opposite side of the fiber lay up. Each is of character which facilitates on application of a vacuum the ready, continuous flow of resin via the resin inlet into the chamber to the marginal edges of said resin distribution medium and flow through of the resin through the fiber lay up.

9 Claims, 4 Drawing Sheets

PLASTIC TRANSFER MOLDING APPARATUS FOR THE PRODUCTION OF FIBER REINFORCED PLASTIC STRUCTURES

Related Applications

This is a continuation in part of pending application Ser. No. 333,747, filed Mar. 30, 1989, which in turn is a file wrapper continuation of application Ser. No. 203,806, filed June 8, 1988, now abandoned. Application Ser. No. 333,747, supra, is now U.S. Pat. No. 4,902,215 which issued on Feb. 20, 1990.

Field of the Invention

This invention relates generally to transfer molding techniques, especially fiber reinforced resin composite structures. In particular, it relates to process and apparatus for the construction of fiber reinforced resin composite structures of various shapes, especially boat hulls.

Background

Fiber reinforced resin composite structures have taken many shapes and forms, tubes or pipes as employed in the chemical processing industry, and flat sheets and compound shapes as employed, e.g., in boat building. In pipe constructions, e.g., relatively thin coaxial layers of resin reinforced fiber filaments are radially spaced and have a plurality of core layers interposed between the resin reinforced fiber layers. In these structures the core layers provide sufficient wall dimension to withstand the external loads to which a pipe is subjected. In the production of flat sheets and some compound shapes, a resin "wetted" fiber reinforcement is laid upon a mold, or a dry lay up of fiber is placed upon a mold and wetted by the resin, the resin in either instance being allowed to set and cure upon the mold to form the fiber reinforced resin composite structure. The apparatus, and/or process, used to make these structures varies considerably depending on the specific shape and form of the structure to be produced.

Vacuum bag techniques have been used in the past to form fiber reinforced plastic structures. In a vacuum bag technique, a flexible sheet, liner or bag is used to cover a single cavity mold which contains the dry or wet fiber lay up. In accordance with the former, the edges of the flexible sheet are clamped against the mold to form an envelope and seal the member, a catalyzed liquid plastic or resin is generally introduced into the envelope, or bag interior, to wet the fiber, and a vacuum is applied to the bag interior via a vacuum line to collapse the flexible sheet against the fiber and surface of the mold, while the plastic wetted fiber is pressed and cured to form the fiber reinforced plastic structure. Resin fumes from the process are prevented from escaping into the ambient work space.

In application Ser. No. 333,747, supra, there is described a vacuum bag process of this type for the production of fiber reinforced resin structures of shape ranging from flat to highly contoured. In forming these structures the resin or fluid plastic is generally applied downwardly with gravity assist to impregnate one or more layers of woven or felted materials, particularly woven or felted fiberglass. Fiberglass reinforced laminates have been formed which have fiber reinforcement-to-resin ratios sufficiently high to provide structures of strength favorably comparable to laminates of substantially similar composition formed by the far more complex prepreg-autoclave processes. The vacuum bag apparatus described in this application, in brief, includes generally the previously known combination of (i) a fluid impervious outer sheet, suitably rigid but preferably a fluid impervious flexible or semiflexible outer sheet, (ii) an inlet in said fluid impervious outer sheet through which a resin, generally a catalyzed resin, can be introduced, (iii) a mold surface upon which one or more layers of a woven or felted fiber, or fabric can be laid, and over which said fluid impervious outer sheet can be laid and its marginal edges sealed to form a chamber within which said layer or layers of woven or felted fiber, or fabric is enclosed, and (iv) a vacuum outlet to said chamber for drawing a vacuum upon said chamber to provide a driving force to assist flow of the resin, and collapse said fluid impervious outer sheet upon the mold surface and press said layer or layers of fiber, or fabric, while resin is introduced via said resin inlet to said chamber. This combination further includes, (v) a resin distribution medium, constituted of spaced-apart strands, or lines, running crisscross one with another, and an open array of separated raised segments providing vertically oriented spaced-apart props, or pillars, and spaced lateral openings between said props, or pillars, which provides a vast array of locations which support the fluid impervious outer sheet and, at these locations, prevent direct contact (or closure) between said outer sheet and the outer surface of said layer or layers of fabric, while the resin introduced into the chamber flows through the lateral openings of the distribution medium to the outer edges thereof for distribution upon or to the outer face of said layer or layers of fabric which become uniformly impregnated with the resin when a vacuum is applied, and resin is introduced via the resin inlet to the chamber.

Whereas the novel vacuum bag technique described by application Ser. No. 333,747 has performed admirably, and insofar as known is capable of providing fiberglass reinforced laminates of uniformity and strength unparalled by prior vacuum bag techniques, there nonetheless remains a need to further improve this system.

Objects

It is, accordingly, the primary objective of this invention to supply this need.

In particular, it is an object of this invention to provide a further improved apparatus for the production of high strength fiber reinforced resin structures, especially fiberglass reinforced resin structures, having high reinforcement-to-resin ratios, ranging in shape from flat to highly contoured.

A further object is to provide apparatus wherein the resin can be continuously applied upwardly, without gravity assist, to more uniformly and consistently form fiber reinforced resin structures of a variety of shapes, from flat to highly contoured, of relatively large size including particularly boat hulls.

A yet further, and more specific object, is to provide a new and improved vacuum bag apparatus for use in the formation of relatively large high strength fiber reinforced resin structures, ranging in shape from flat to highly contoured, particularly boat hulls.

The Invention

These objects and others are achieved in accordance with this invention embodying improvements in resin transfer molding techniques, or apparatus which includes elements corresponding to those utilized in application Ser. No. 333,747, supra—either identical, or functionally equivalent to—but employed in different combinations to provide further improved results, and advantages. The novel structure includes the combination of (1) a fluid impervious outer member, or sheet, preferably a rigid or semi-rigid sheet, (2) one or more inlets or outlets (for resin or vacuum), preferably vacuum outlets located in said fluid impervious outer member, or sheet, (3) a mold surface upon which one or more layers of a woven or felted fiber, or fabric, can be supported, and over which said fluid impervious outer member, or sheet, can be laid and its marginal edges sealed therewith to form a chamber within which said lay up of woven or felted fiber, or fabric, can be enclosed, (4) one or more inlets or outlets (for resin or vacuum) in said mold, preferably an inlet, or inlets, through which a resin, generally a catalyzed resin, can be introduced to said chamber, (5) a first, primary, resin distribution medium for location atop the layer, or layers, of woven or felted fiber, or fabric, and below said resin or fluid impervious outer member or sheet, (6) and a second primary, resin distribution medium for direct location upon the mold surface, and atop which the lay up of woven or felted fiber, or fabric, can be supported. In accordance with this construction, a resin can be introduced into said chamber-via said inlet, or inlets, in said mold, and a vacuum applied upon the chamber via said vacuum outlet, or outlets, located in said fluid impervious outer member, which will result in the resin being distributed across substantially the entire face at the entry side of the second resin distribution medium, flowed substantially uniformly and continuously through the lay up of woven or felted fiber, or fabric, and thence substantially uniformly, continuously and without interruption, passed therethrough to exit into the first resin distribution medium and flow from the chamber via the vacuum outlet, or outlets, of said fluid impervious outer member, or sheet.

This novel combination, unlike that described in the '747 application, thus includes resin distribution on both sides of the lay up of woven or felted fiber, or fabric; a first resin distribution medium located between the upper face of the lay up and the fluid impervious outer sheet, and a second resin distribution medium located between the lower face of the lay up and the mold surface. This dual sandwich type construction, on application of a vacuum, permits the resin to flow more freely, or with less resistance, continuously and even upwardly against gravity, to uniformly and fully impregnate the lay up. Very little resin is lost, or wasted, by withdrawal through the vacuum outlet, or outlets, and this system has proven admirably suited to the production of thick, large-in-area laminated structures ranging from flat to highly contoured. A feature of the dual sandwich type of construction is that the units can be staged, even vertically, one with another to produce laminated structures of which are quite thick, and cover very large areas.

The characteristics of a preferred apparatus, and technique for its use, as well as its principle of operation, will be more fully understood by reference to the following detailed description, and to the attached drawings to which reference is made in the description. The various features and components in the drawings are referred to by numbers, similar features and components being represented in the different views by similar numbers. Subscripts are used in some instances with numbers where there are duplicate features and components, or to describe a sub-feature or component of a larger assembly.

Figure 1:
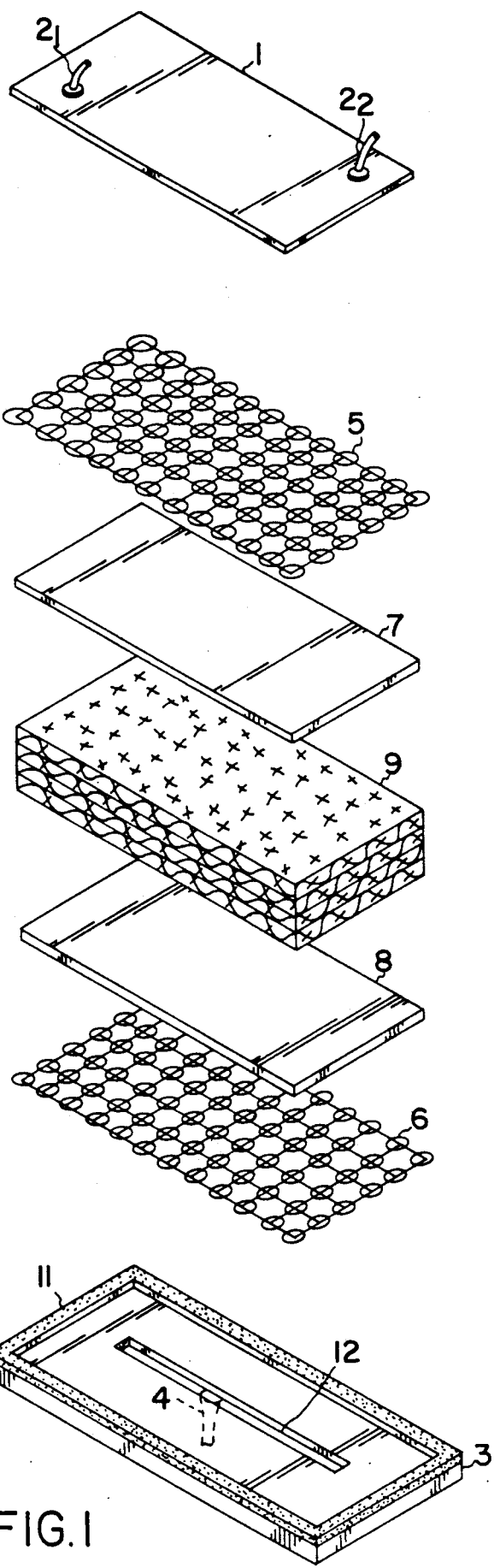
FIG. 1 depicts an exploded view of a molding assembly of planar shape, the molding assembly including a fluid impervious rigid, or semi-rigid outer sheet provided with vacuum outlets, a lower rigid mold surface complete with a vacuum outlet against which the marginal edges of said outer sheet are sealed to form an inner chamber, a fiber lay up constituted of a plurality of layers of a dry fiber reinforcing fabric, two primary resin distribution mediums one of which is located between the lay up and the mold surface, and the other between the lay up and the fluid impervious outer sheet, and two peel plies one of which separates the lower face of the lay up and a primary distribution medium, and the other the upper face of the lay up and a primary distribution medium.
Figure 2:
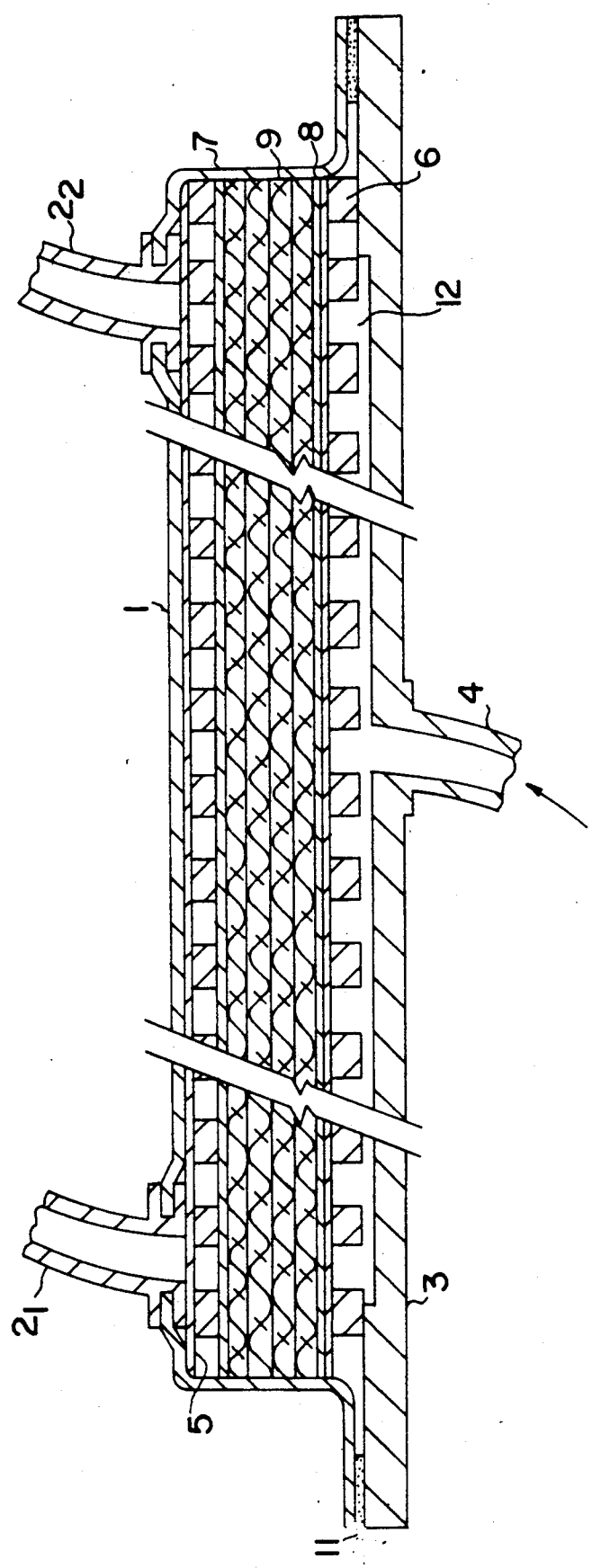
FIG. 2 depicts a section view of assembled mold, as described in the preceding figure.

Referring first to FIGS. 1 and 2, there is shown a mold of planar design which has been found admirably suitable for the ready formation of fiber reinforced plastic structures of great strength, structures having physical qualities normally found in structures of corresponding fiber and resin composition molded and formed by a prepreg-autoclave process. In the mold, a fluid impervious outer sheet 1, provided with vacuum outlets $2_1$, $2_2$, is marginally sealed with an adhesive or tape 11 upon a mold surface 3, the space between the inside face of the outer sheet 1 and upper face of the mold surface 3 forming therebetween a chamber, or mold space. The outer sheet 1 is provided with vacuum outlets 2, and the mold surface 3 with an inlet 4 through which a resin, suitably a catalyzed resin, can be supplied to the chamber, or mold space. A secondary resin distribution channel 12 (shown in dashed lines in FIG. 1) aids in the distribution of resin to the primary resin distribution medium 6. A vacuum drawn upon vacuum outlets 2 can thus exhaust the chamber, or mold space, of gas, and resin introduced into the chamber, or mold space, will be distributed via the secondary distribution medium 12 across the lower face of the primary resin distribution medium 6.

The chamber, or mold space, it will be observed, is provided with two primary resin distribution media, generally structurally identical, though not necessarily, one with the other, a first primary resin distribution medium 5 located between the upper face of a lay up 9 and the inside face of the fluid impervious outer sheet 1; the second primary resin distribution medium 6, as mentioned, lying between the lower face of the lay up and the mold surface 3. Optionally, and preferably as herein illustrated, the combination also includes a pervious membrane, perforated film or the like as a peel ply, i.e., a first peel ply 7 which physically separates the first primary resin distribution medium 5 from the upper face of the lay up 9, and a second peel ply 8, or resin pervious member, located between said second primary resin distribution medium 6 and lower face of the lay up 9 of woven or felted fiber, or fabric. Additionally, and preferably, as suggested, the combination also includes a secondary resin distribution medium 12 for more rapid distribution of the resin across the entry face of said second primary resin distribution medium. Pursuant to this unique structural combination of elements, particularly the primary resin distribution medium 6 which prevents closure between the lower face of the lay up 9 and mold surface 3, provides rapid dispersal of resin throughout said resin distributin medium 6 and application of resin over the entire lower face of the lay up 9, resin can be continuously passed upwardly through the primary resin distribution medium 6, peel ply 8, and into the lay up 9 or woven or felted fiber, or fabric. The resin, after uniformly wetting and impregnating the lay up 9 of woven or felted fiber, or fabric, due largely to the presence of the primary resin distribution medium 5 which prevents closure between the inner face of the fluid impervious outer sheet 1 and upper face of the lay up 9 to maintain uniform application of the vacuum across the face of this member—and hence, it is functionally primarily a vacuum distribution member—can then readily pass through the peel ply 7, primary resin distribution medium 5 out of the chamber, or mold space, via vacuum outlets 2 of the impervious outer sheet 1. As this readily observable phenomenon occurs, or begins to occur, the lay up of woven or felted fiber, or fabric, is generally completely, uniformly saturated with the resin.

This structural combination is generally similar to that described in application Ser. No. 333,747 except that on the resin entry side of the mold structure, the resin is passed downwardly with gravity assistance through a resin inlet located in the impervious outer sheet, distributed via a secondary pervious resin inlet upon the upper face of a primary resin distribution medium whereupon it is then passed downwardly, optionally through a peel ply, through the lay up of woven or felted fiber, or fabric, which is directly rested on top of a mold support surface provided with a vacuum outlet. It also differs from the present novel structural combination which further includes on the alternate or opposite side of the lay up 9 a second primary resin distribution medium 6, optionally a second peel ply 8, and also a secondary resin distribution means 12, preferably located in the inside face of the mold surface. This combination enables the resin to flow more freely, continuously, and even upwardly against the force of gravity, to fully and uniformly saturate the lay up of woven or felted fiber, or fabric. The satisfactory formation of larger area, thicker woven or felted fiber lay ups, is made possible by this improved structural combination. Moreover, structural units such as described by reference to these figures can be staged to further remove area limitations.

In the operation of a mold assembly as desscribed by reference to FIGS. 1 and 2, in any event, a resin distribution medium 6 is laid upon the mold surface 3, and a peel ply 8 is placed on top of the resin distribution medium 6. A dry lay up 9 of one or a plurality of layers of a fabric, or fabrics, is then placed upon the upper face of the peel ply 8 within the confines of the mold chamber, and thereupon is placed a second peel ply 7, and second primary resin (or vacuum) distribution medium 5. The fluid impervious outer sheet 1 is then sealed against the marginal edges of the mold surface 3. Suction is then applied upon the mold via vacuum outlets 2 to draw a vacuum upon the mold interior, or mold cavity, and resin is introduced via resin inlet 4. The resin is dispersed from the point of initial introduction, in part through the secondary distribution channel 12 in the face of the mold surface 3, into the primary resin distribution medium 6, via the channels therein to the very outer edges of said resin distribution medium 6, the resin flowing vertically upwardly over the whole area of the primary distribution medium 6 to percolate upwardly through the layers of fabric. The impervious outer sheet 1, as a result of the applied vacuum, is drawn downwardly over its entire area against the upper disposed primary resin (or vacuum) distribution medium 5, and entire upper face of the mold, the layers of fabric being thereby compressed.

The resin flows freely upwardly through the layers of fabric, the second peel ply 7 and second primary resin (or vacuum) distribution medium 5 to the vacuum outlets 2. The resin supply to the resin inlet 4 is then cut off and the resin impregnated fabric is cured.

After the resin has cured, the vacuum pulled upon the mold chamber via vacuum inlet 2 is cut off, and the impervious outer sheet 1, primary resin (or vacuum) distribution medium 5, and peel ply 7 are peeled from the flat, compact, fiber reinforced plastic structure. The peel ply 7 facilitates removal of the impervious outer sheet 1 and primary resin (or vacuum) distribution member 5, leaving the face of the flat, compact, fiber reinforced plastic structure from which these layers have been peeled a surface which is conditioned for the acceptance of a paint or other type of coating, if desired. The primary resin distribution medium 6 and peel ply 8 are similarly stripped from the opposite face of the cured lay up, after removal of these components from the mold surface 3. Without the presence of the peel plies 7, 8 the surfaces from which these members are removed is very smooth and must be sanded, or otherwise surface abraded if a paint or other type coating is to be applied.

The resin entering the mold chamber via the resin inlet 4, by virtue of the primary resin distribution medium 6 and primary resin (or vacuum) distribution medium 5 flows continuously and without interruption via the open continuous network of passageways from the point of entry into the distribution medium 6 to the marginal edges of the resin distribution medium 6, and thence upwardly over substantially the entire face through the lay up of one or more layers of reinforcing fabric, e.g., felted glass fibers or woven glass fabric. In contrast, but for the presence of the resin distribution media, the resin entering the mold chamber would, even after many hours, and with the constant assistance of squeegeeing and massaging the outer surface of the impervious outer sheet, spread only slowly outwardly from the point of entry over the surface of the reinforcing fabric, some of the resin penetrating the reinforcing fabric leaving behind areas which are dry, or inadequately wetted by the resin. In such event, channeling occurs, forming after curing, a fiber reinforced plastic structure having a relatively low reinforcing fiber-to-resin ratio, and overall non-uniform structure of generally low quality. Vacuum pressure would be lost in areas where the resin seals. Furthermore, under these conditions one would not be able to maintain the vacuum on the laminate in the areas between the outer edge of the resin advance and the resin inlet port, this resulting in a loss of pressure on the laminate and reduced contact between the fiber and resin in these areas.

The primary resin distribution media 5, 6 per se are of the same structure as described by reference to application Ser. No. 333,747. Each is constituted of spaced-apart strands, or lines, running crisscross one with another, and an open array of separated raised segments providing vertically oriented spaced-apart props, or pillars, and spaced lateral openings between said props, or pillars, which provides a vast array of locations which support the fluid impervious outer sheet 1, or lay up 9 upon the face of the mold surface 3 and, at these locations, prevent direct contact (or closure) between said outer sheet 1 or mold surface 3 and the outer surface of said layer or layers of fabric, while the resin introduced into the chamber flows through the lateral openings of the distribution medium to the outer edges thereof for distribution upon or to or from the outer faces of said layer or layers of fabric which become readily uniformly impregnated with the resin when a vacuum is applied, and resin is introduced via the resin inlet to the chamber.

The strands, or lines of which the resin distribution medium are constructed are preferably constituted of plastic monofilaments which are non-resin absorptive. In one form, the lines of the resin distribution medium are spaced apart and cross at right angles one to another, and beads, posts, or pillars of substantially uniform dimensions are located on a side of the structure where the lines cross. The resin distribution in another of its forms is one wherein the lines are of sufficient thickness that they form intersecting slats which act as pillars between which lateral openings are provided to act as conduits for transport of the resin. In yet another of its forms, the resin distribution can be constructed as a knitted, or woven fabric, separated segments of which are raised to form pillars, or rows of pillars, and spaces therebetween forming lateral channels through which resin can flow freely when the resin distribution medium is in place separating the outer impervious sheet and the lay up of fiber, or fabric, supported on the mold surface.

In all of these embodiments, the resin distribution medium is designed to prevent closure between the inner face of said impervious outer flexible or semi-flexible sheet and upper surface of the lay up of fabric, or between the mold surface and lower face of the lay up of fabric. Due to its open pillar-like structure, and the continuous network of lateral openings lying between these pillars, a continuous network of passageways in all directions is provided from the point of entry of the resin, or fluid plastic, over the whole area of the distribution medium. Consequently, when a vacuum is drawn upon the mold, resin introduced, and the impervious outer sheet is collapsed inwardly upon the fibrous material, or mold surface, the resin introduced into the mold will flow quite rapidly, continuously and without interruption via the network of passageways from the point of entry, or resin inlet, to the outer marginal edges of the distribution medium, and from there into the mold space over substantially the entire area of the distribution medium through the fabric lying thereover to virtually completely saturate the one or more layers of fabric with the resin. The fabric lay up on the mold is substantially uniformly wetted by the fluid plastic, or resin, and the resin (or vacuum) distribution medium is simultaneously tightly pressed by the collapsed impervious outer sheet, and the former directly pressed against the upper face of the fabric, while the resin is cured to form the fiber reinforced plastic structure.

Figure 3:
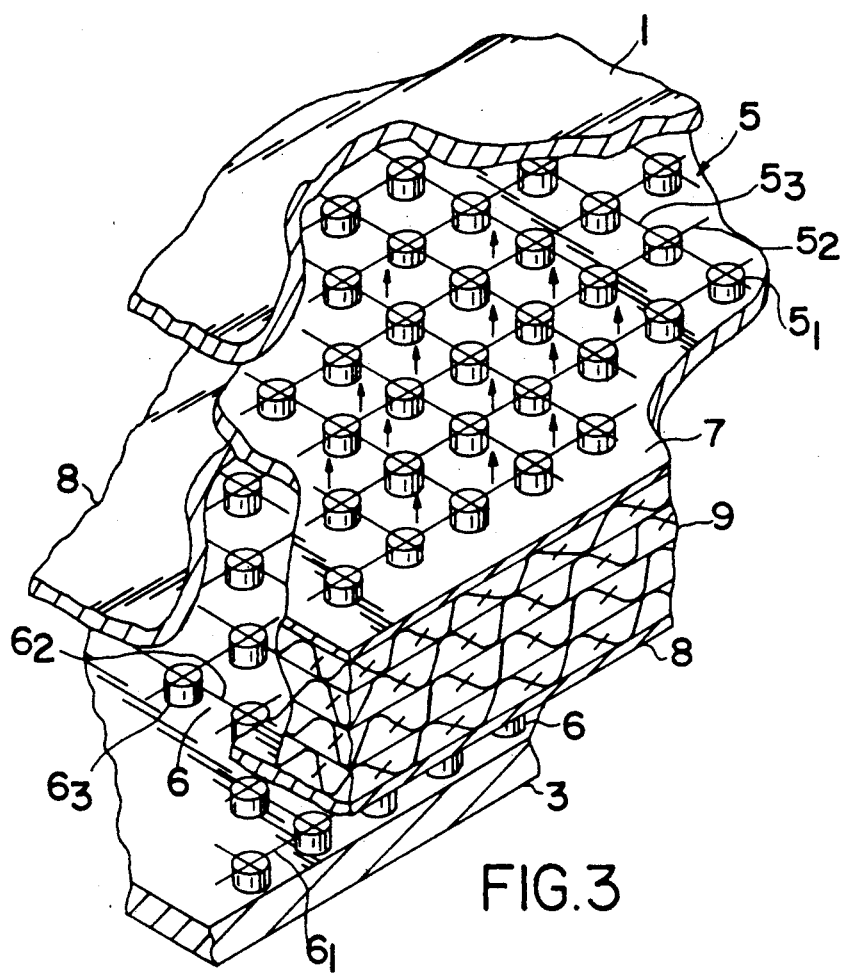
FIG. 3 depicts a close up isometric view, in partial section, of a segment of the molding assembly of FIGS. 1 and 2, showing particularly a resin distribution medium, as employed in the mold.

Specific reference is made to FIG. 3 which shows in better detail a preferred primary resin distribution medium 5, more generally represented in FIGS. 1 and 2. Primary resin (or vacuum) distribution medium 6 is structurally identical to primary resin distribution medium 5, albeit each serves a somewhat different function in the overall combination. Thus, as indicated, the function of primary resin (or vacuum) distribution medium 5 is to distribute the applied vacuum uniformaly across the upper face of the peel ply 6 and lay up 9, and prevent the vacuum from being sealed off by the resin. The function of primary resin distribution medium 6, on the other hand, is to distribute the resin rapidly uniformly across the lower face of the lay up 9 for the rapid and uniform penetration thereof. The primary resin (or vacuum) distribution medium 5, as will be observed, lies directly under and in direct contact with the impervious outer sheet 1. It is constituted of an open network of non swelling, non resin absorptive monofilaments, a first set of spaced apart parallelly aligned monofilaments $5_2$ horizontally aligned one with respect to the other, and a second set of spaced apart parallelly aligned monofilaments $5_3$ vertically aligned one with respect to the other. The sets of monofilaments $5_2$, $5_3$ respectfully, are laid to intersect one set with the other at generally right angles, the points of contact being adhered one to the other to form an open mesh-like structure, or network, of contiguous parallelograms, or squares. At each of the intersections where the monofilaments $5_2$, $5_3$ cross, there is provided a bead, post, pillar or pillar-like member $5_1$ of substantially equal length the upper end of which is adhered to the lower face of the crossed monofilaments $5_2$, $5_3$, while the lower end thereof is projected substantially downwardly, or perpendicular to the plane formed by the open mesh structure. The cylindrical shaped posts $5_1$ are thus substantially equally spaced apart in any given direction, the upper ends of each pressing against the inner face of impervious outer sheet 1, while the lower terminal ends of each rest atop the optionally supplied peel ply 7 which lies across the upper face of the top ply of the lay up 9 of woven fiber, or felt, e.g., a glass fabric. The primary resin distribution medium 6, on the other hand, is constituted of structural elements $6_1$, $6_2$, $6_3$ corresponding to structural elements $5_1$, $5_2$ and $5_3$ of the primary resin (or vacuum) distribution medium 5. The posts $6_1$ support the open structure formed by the monofilaments $6_2$, $6_3$ on top of which rests peel ply 8. The lower ends of ports $6_1$ in turn rest upon the mold surface 3, and prevents closure of the mold face 3 with the lower face of peel ply 8, or lay up 9. When a vacuum is applied upon the composite structure, the outer impervious sheet 1 will be pressed down very tightly against the resin (or vacuum) distribution medium 5, while supported by the posts $5_1$ to provide a continuous network of open passageways between the inner face of the outer impervious sheet 1 and upper face of the peel ply 7; or upper face of the top ply of fabric 9 if the peel ply 7 is not present. An applied vacuum will be uniformly applied throughout the resin (or vacuum) distribution medium 5. Consequently, a liquid plastic or resin introduced via the resin inlet 4 into the primary resin distribution medium 6, and applied uniformly across the lower face of lay up 9, on application of a vacuum, will readily pass upwardly through the openings of the resin distribution medium 6 flowing virtually without obstruction through said lay up 9. Virtually the entire area of the resin distribution medium 6 between the posts 6₁ will thus be filled with the liquid plastic, or resin, from where the resin will pass, or percolate, directly outwardly and upwardly through the ply or plies to substantially completely, uniformly "wet" fabric lay up 9. Once the vacuum is applied, and the flow of resin via line 4 to the system initiated, the resin will flow without interruption, and without any squeeging or massaging of the outer sheet 1 by an operative. The applied vacuum constitutes the only driving force for the resin and, so long as it persists even though the vacuum pump is cut off, the resin will continue to flow without the aid or attendance of an operative.

Figure 4:
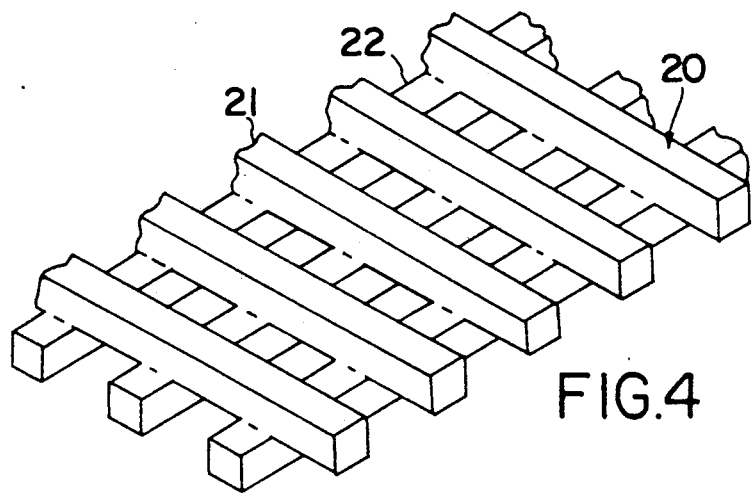
FIG. 4 depicts a second form of resin distribution medium per se; this resin distribution medium being also of a form preferred for use in the molding assembly depicted by reference to FIGS. 1 and 2.

A second form of the resin distribution medium is described by reference to FIG. 4. Referring to FIG. 4 there is shown a grid-like structure 20 constituted of two sets of spaced-apart parallel aligned strips, a first set of strips 21 and a second set of strips 22 running at right angles with the first set of strips. The structure 20, substituted for one or both of the structure 5 or 6 in the mold assembly described by reference to FIGS. 1-3, thus provides an open network of pillar-like components for (A) propping up and supporting the impervious outer sheet 1 at a level above the peel ply 7, or upper face of the top ply of fabric 9 if the peel ply 7 is not present, or (B) propping up and supporting the peel ply 8 and lay up 9, or lay up 9 if the peel ply 8 is not present, while simultaneously providing a network of continuous openings for uniform application of a vacuum, or the passage and continuous distribution of the resin from the point of inlet 4 to the marginal edges of said resin distribution medium 6, and passage through the lay up 9. For example, resin, on application of a vacuum, would thus flow upwardly from inlet 4 into the laterally aligned openings between upper strips 21, the upper surfaces of which would, e.g., be in direct contact with the lower face of peel ply 8, or lay up 9 if peel ply 8 were not present, into the upwardly vertically faced openings between strips 21, 22. From therein, the resin would flow laterally between the parallel aligned channels between strips 22, the bottom faces of which rest upon mold surface 3, to the marginal edges of said distribution medium 20. The resin, substantially uniformly distributed across the lower face of the peel ply 8, or lower face of fabric 9 if the peel ply were not present, would then percolate upwardly through the layer, or layers of fabric 9.

Other forms of primary resin distribution media as described by reference to application Ser. No. 333,747, supra, are also useful in the practice of this invention. Such primary resin distribution media are fully described at Page 9, lines 1-38, Page 20, lines 1-38 and Page 21, lines 1-11, and by reference to FIGS. 5-7 of the drawings. These embodiments, herein referred to as useful in the practice of this invention, are herewith incorporated and made part of the present application by reference.

Figure 5:
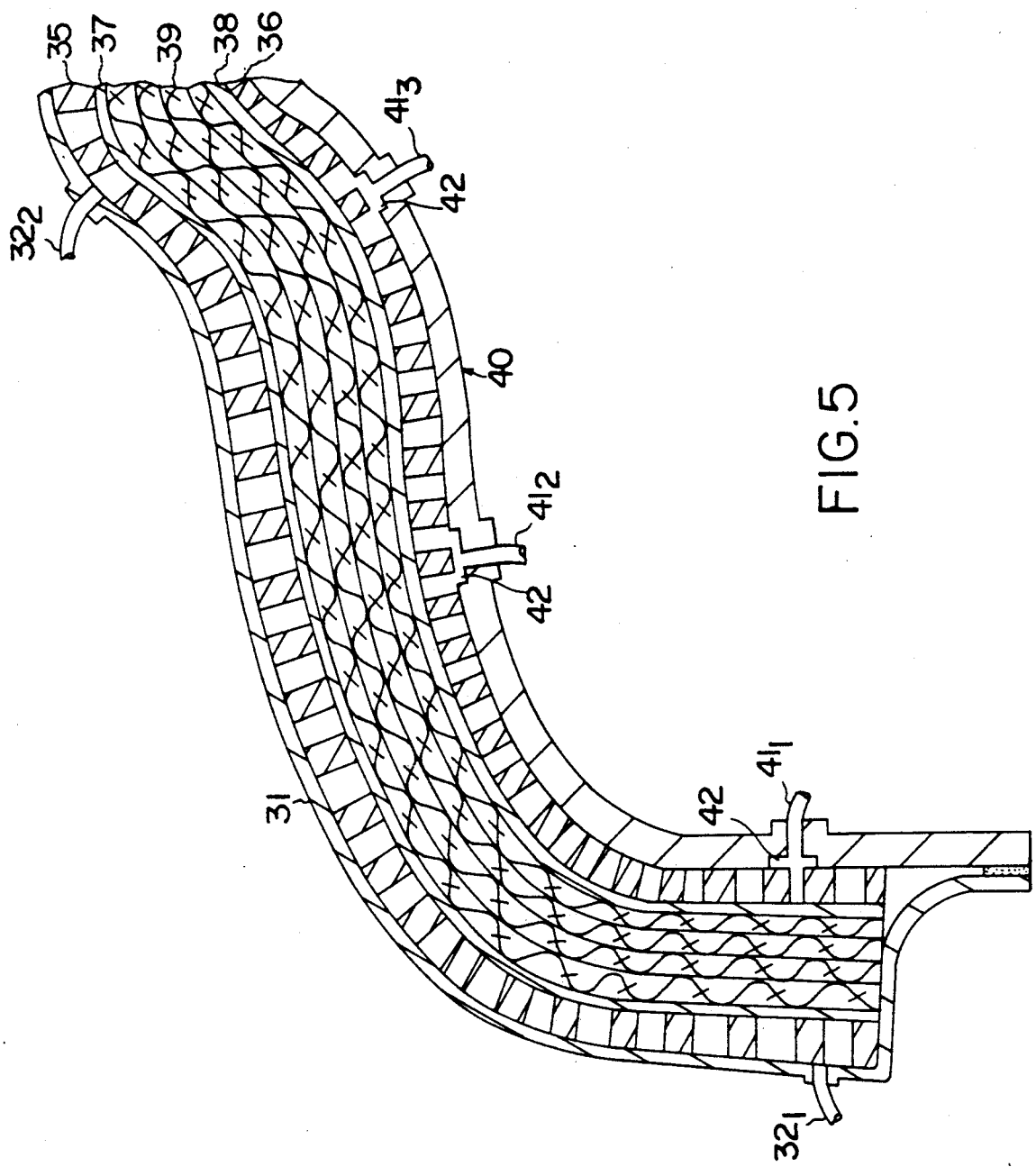
FIG. 5 depicts a cross-sectional view of a plurality of mold segments, staged one in conjunction with another, as used in the construction of a boat hull.

Reference is now made to FIG. 5 showing a plurality of staged units as used in the construction of a large boat hull. This figure shows, for purposes of illustration, one-half of a boat hull (a contiguous like assembly constituting its mirror image), the fore and aft sections being omitted, to simplify the drawing. The figure illustrates generally a mold surface 40, in this instance a male mold within which is provided a plurality of staged spaced apart resin inlets 41₁, 26 41₂, 41₃ through each of which resin can be individually supplied from a supply source to the mold surface. The outside face, or mold support surface, is provided with grooves 42, or surface indentations, which act as a secondary resin distribution medium to supply resin to the area which surrounds the points of resin entry. In setting up the assembly for use, a primary resin distribution medium 36 is first laid in place upon the mold surface 40, and thereover is placed a peel ply 38. A lay up 39 comprised of one or more plies of woven or felted fibers, or fabric, is then placed atop the peel ply 38. Over the lay up 39 there is placed a second peel ply, perforated or resin pervious film 37, and thereover is laid a second primary resin distribution medium 35. This assembly is then covered by a fluid impervious outer sheet 31 provided with vacuum outlets 32₁, 32₂, the contour of which corresponds with that of the mold surface 40. The sheet 31 when fixed in place and the edges (not shown) sealed completely covers the various layers supported upon the mold surface 40 and provides a contiguous chamber, or mold space, upon which a vacuum can be drawn, and to which a resin can be supplied. Resin supplied via the resin inlets 41₁, 41₂, 41₃ thus spreads laterally outwardly, and moves upwardly upon the mold surface via means of the secondary resin distribution medium 42 and, especially, the primary distribution medium 36 covering its entire surface from which it is directed uniformly outwardly and upwardly through the peel ply 38 and lay up 39. The resin, due to the presence of the primary resin distribution medium 36, and primary resin (or vacuum) distribution medium 35, flows continuously through and thoroughly wets the lay up 39 moving to the vacuum outlets 32₁, 32₂ at which time the flow of resin to the resin inlets 41₁, 41₂, 41₃ is cut off. The resin is then cured. The outer plies constituting the impervious outer sheet 31, primary resin distribution medium 35 and peel ply 37 are then peeled away from the fiber reinforced resin composite hull. The composite hull is then removed from the mold surface 40, and the plies constituted of the peel ply 38, primary resin distribution medium 36 then peeled from the opposite face of the hull.

The same concept is applicable to the formaation of a fiber reinforced resin composite hull in use of a female mold. In this instance, the opposite, or inside face of the mold 40 provides the surface upon which the primary resin distribution media 35, 36, peel plies 37, 38 and lay up 39 are placed, and over which the contoured fluid impervious outer sheet 31 is provided as a cover.

After assembly of the components needed to form the laminate, a very large area fiber reinforced resin composite, ranging from flat to highly contoured, can be readily formed by careful control of the applied vacuum, and timing of the resin injection, so that a resin can "climb" even a vertical laminate and progressively gelled as the process proceeds. Laminated structures of thicknesses ranging from about 1/32 inch to about 4 inches, and greater, which have great strength, can be readily formed pursuant to the practice of this invention. Moreover, laminated structures having surface areas, ranging from flat to highly contoured, of areas ranging from 1 ft² to about 5000 ft², and greater, can be readily formed pursuant to the practice of this invention.

The following non-limiting examples are further illustrative of this invention.

The technique described herein has proven itself well suited to the production of laminar composites of large surface area, and thickness, ranging from flat to highly contoured. The technique described in application Ser. No. 333,747, supra, has been successfully employed to saturate laminates up to 1.5 inches in thickness. However, the technique of this invention makes it feasible to readily produce laminates of much greater thickness. Moreover, the technique described in application Ser. No. 333,747, supra, has proven well suited to the production of moderately large area laminated panels. For example, 8'×16' panels made by this technique are reputed to be among the largest laminated panels made in this country. In contrast, however, the technique of this invention makes it feasible to mold panels of area many times larger than an 8'×16' panel. The construction of thicker, larger area laminates becomes feasible; even the construction of thick, large area laminates ranging in shape from flat to highly contoured.

EXAMPLE 1

A laminated sheet constituted of fiberglass and vinyl resin was made pursuant to the technique described by reference to FIGS. 1-3 by injecting a 3000 oz. per sq. yd. of E type fiberglass fabric. The finished laminate thickness was 2.7 inches or 0.0009" per ounce of fabric. This compares to an average thickness per ounce of fabric of 0.0015" for hand layed fabric. The hand layed laminate has a reinforcement/resin ratio of 50% by weight and the laminate made by the process, and apparatus of this invention, has a reinforcement/resin ratio of 75% by weight. Resin flow is estimated to be approximately double the rate attainable by the earlier process, and apparatus.

EXAMPLE 2

A section of a 50' boat hull was built to simulate the injection of a part of that size. Three resin inlets and distribution channels were placed in the mold section spaced equally in the vertical direction with the distribution channels running horizontally at the same level as the inlet ports. Vacuum ports were placed only on the top (simulated keel) and at the bottom (simulated gunwale) of the mold to create an injection scenario to mimic the full size hull. Resin was injected into the bottommost port first, allowed to flow through the laminate until it was visually observed to be at the level of the second port, the first port was closed off, and the second was opened. This sequence was repeated when the resin was observed to reach the second port when the second port was closed and the third opened. When the resin reached the keel, the topmost port was closed and the injection was complete.

The laminate was allowed to cure and was stripped from the mold. Measurements were made at different vertical positions to determine the thickness of the laminate. No significant thickness variations were observed, proving that the staged resin injection maintained a consistent vacuum pressure over the entire vertical distance of the hull section. The thickness measurements indicated that the reinforcement/resin ratio was in the 70%-75% range. The quality of the laminate was observed to be as good in all respects as a laminate made with by the process described in application Ser. No. 333,747, supra, with the exception that neither surface of the laminate had a smooth gel-coated surface. This is not considered to be an important factor in the production of an extremely large hull, given the other significant advantages provided by the process, and apparatus of the present invention, to wit:
High strength to weight ratios;
Low void content laminates;
Low vapor emissions; and
Low cost molds.

EXAMPLE 3

A demonstration part is being built as part of a project to replace all aluminum structural system in an external fuel tank for aerospace use.

The part embodies a carbon fiber/epoxy rib stiffened circular structural member. This part is normally extremely difficulty to build because there are many small integral hat type stiffeners on this part which must be molded at the same time as the rest of the part. Placing the inlet ports in the vacuum film and the pervious conduit over the part proved to be extremely difficult as the hat type stiffeners tended to be easily moved out of place while arranging the resin inlets and the pervious conduits. The solution to the problem is provided by the process, and apparatus, of this invention in that the resin inlet and the pervious conduit are part of the mold and the vacuum film need not be fitted with resin inlets and pervious conduits.

The process, and apparatus, of this invention is working well on this project and initial parts have been made with aerospace quality and fiber contents. Final parts are expected to have fiber contents in the 60% by volume range, which is as good as is achieved by other aerospace fabrication techniques, including the much more expensive prepreg-autoclave techniques.

The process, and apparatus, of this invention offers certain advantages over earlier processes, e.g., that described by reference to application Ser. No. 333,747, supra. For example, in the production of many industrial and aerospace parts, the resin inlet can be permanently installed in the mold. This different approach has several distinct advantages:

a. In building precise parts which have difficult molding features, such as molded in structural ribs, etc., having to fit the resin inlet and the pervious conduit into the impervious outer sheet over the part on the mold can be extremely difficult and in some cases virtually impossible without disturbing the precise placement of dry reinforcements and rib cores and the like. In these cases, having the resin inlet and the resin conduit permanently built into the mold can make the construction of these precise parts possible.

b. In building very large parts, such as a large boat hull, placing the resin inlet and the pervious conduit in the vacuum film, has distinct physical difficulties. Special staging may have to be built in order to reach all areas of the piece that is being built without damaging the vacuum film or disturbing the placement of the dry reinforcement. Furthermore, holding the pervious conduit in proper alignment also presents difficulties when working over a very large area. Having the resin inlet and the pervious conduit permanently built into the mold eliminates these problems.

c. In building very large parts, such as a large boat hull, the resin may have to travel vertically for some distance, in some cases for 20 or 30 feet or more. Unless some special provision is made for this, the vacuum pressures on the laminate will vary greatly over the vertical areas of the hull. If the distance to be traveled is greater than some specific amount (depending upon the viscosity of the resin this will be less than 33 feet, the theoretical maximum for vacuum lift) the resin will not flow at all. This problem is solved by staging the resin input which is done by arranging resin inlets and conduits at some convenient interval, say every 3 feet, and injecting the resin one level at a time. The resin may also be staged in curing so that lower levels cure before the upper levels are injected. Using this procedure, very large hulls may be injected and the vacuum pressure on the laminate may be maintained within acceptable limits in all parts of the laminate. Having the resin inlets and conduits permanently as part of the mold facilitates this procedure greatly as the placement will be precise and always the same hull after hull.

d. The progress of the resin injection is easier to monitor. In the earlier process the resin is injected over the surface of the laminate and then percolates through the reinforcement to thoroughly wet the reinforcement all the way to the mold surface. In the present process the resin is injected at the mold surface and then percolates outward to the surface. When the resin reaches the surface, all the reinforcement has been wet and the injection is completed. The point at which the injection is complete is far easier to monitor inasmuch as the progress of the resin can be monitored visually.

e. The location or leaks in the impervious outer sheet are easier to find. In the earlier process leaks in the outer sheet may be located by observing small air bubbles in the resin as it travels through the primary distribution medium. This is no problem with small parts as close visual inspection is easy. However, large parts are more difficult to monitor, as the entire area must be closely examined by a trained eye. In this process the presence of a vacuum leak is shown by an area of the reinforcement which does not wet with the resin. The presence of such an area is quickly noticeable by even a casual observer and can be easily repaired.

The fiber-to-resin ratios of the very high strength materials made pursuant to the practice of this invention compare favorably with panels of similar construction made by prepreg-autoclave techniques, and contain two times the fiber-to-resin ratios of panels made by most known transfer molding techniques.

The viscosities of resins which have been successfully employed in accordance with the invention described herein ranges from about 200 cps to about 1000 cps, and higher viscosity resins can be employed though the process cycle may be increased.

The techniques described herein are capable of some variations without departing the spirit and scope of this invention, as will be apparent to those of skill in this art.

Fibrous reinforcing materials per se are well known, and a numerous range of such materials can be used in accordance with this invention. Such materials include, e.g., glass, aramid, graphite boron fiber and the like. The same is true of resins and include, i.e., epoxy, polyester, vinylesters and the like.

Having described the invention what is claimed is:

1. In apparatus wherein is included
a fluid impervious outer sheet,
a mold surface upon which can be supported a lay up of one or more layers of a fibrous material, and over which can be placed said fluid impervious outer sheet and its edges marginally sealed upon said mold surface to form a chamber,
a resin inlet for introducing resin into said chamber for contact with said lay up of fibrous material,
a vacuum outlet for drawing a vacuum upon said chamber,
the improved combination which further includes
a pair of primary resin distribution media, one located upon the mold surface beneath the lower face of said lay up and the other atop the lay up between said lay up and said fluid impervious outer sheet; a primary distribution medium being constituted of spaced-apart lines running crisscross one with another, and an open array of separated raised segments on the surface of said structure which act as vertical pillars to prop apart the lower face of said lay up and the mold surface, and the upper face of said lay up and the impervious outer sheet, to simultaneously maintain a network of connecting upwardly faced vertical openings and connecting lateral passageways through which resin can flow freely through the first said primary resin distribution medium from the point of resin introduction to the marginal edges of said first resin distribution medium over the entire area adjacent thereto and through the lay up and thence from the downstream face of the lay up through the second said primary distribution medium when vacuum is applied upon said chamber and said impervious outer sheet is collapsed upon the mold surface.

2. The apparatus of claim 1 wherein the spaced-apart lines of the resin distribution medium which crisscross form two sets of lines parallel one with another and are constituted of a non swelling, non resin absorptive monofilament, and the raised segments are constituted of beads, knob-like projections or pillars located at the crossed intersections of the lines on a surface of the structure.

3. The apparatus of claim 1 wherein the spaced-apart lines of the resin distribution medium which crisscross form two sets of lines parallel one with another and constituted of a non swelling, non resin absorptive slats of sufficient thickness to form parallel rows of pillars, and intersecting channels via which the resin can be transported throughout a resin distribution medium.

4. The apparatus of claim 1 wherein the resin distribution medium is in the form of a fabric knitted from a non swelling, non resin absorptive monofilament, and the raised segments are provided by areas of increased bulk appearing as rows of separated pillars.

5. The apparatus of claim 1 wherein the resin distribution medium is in the form of a fabric woven from a non swelling, non resin absorptive monofilament, and the raised segments are provided by areas of increased bulk appearing as rows of separated pillars.

6. The apparatus of claim 1 wherein the combination further includes, between said resin distribution medium and the face of said lay up, a peel ply porous to resin which provides a peel surface.

7. The apparatus of claim 1 wherein the combination further includes, between said resin distribution medium and the upper face of said lay up, a peel ply porous to the resin which provides a peel surface, for removal of the fluid impervious outer sheet, a primary resin distribution medium and peel ply itself from the wetted, cured fiber reinforced plastic structure.

8. The apparatus of claim 1 wherein the resin is introduced into a resin inlet located in the mold surface, and the vacuum is applied via vacuum outlets located in the fluid impervious outer sheet.

9. The apparatus of claim 1 wherein the shape of the mold is flat or contoured.

* * * * *